3,519,010
FLOW COMPARING SHUT-OFF VALVE
Raymond P. Helling, Florissant, and Allen H. Owen, Jr., Kirkwood, Mo., assignors to McDonnell Douglas Corporation, St. Louis, Mo., a corporation of Maryland
Filed Dec. 21, 1967, Ser. No. 692,602
Int. Cl. G05d 11/03
U.S. Cl. 137—100                    11 Claims

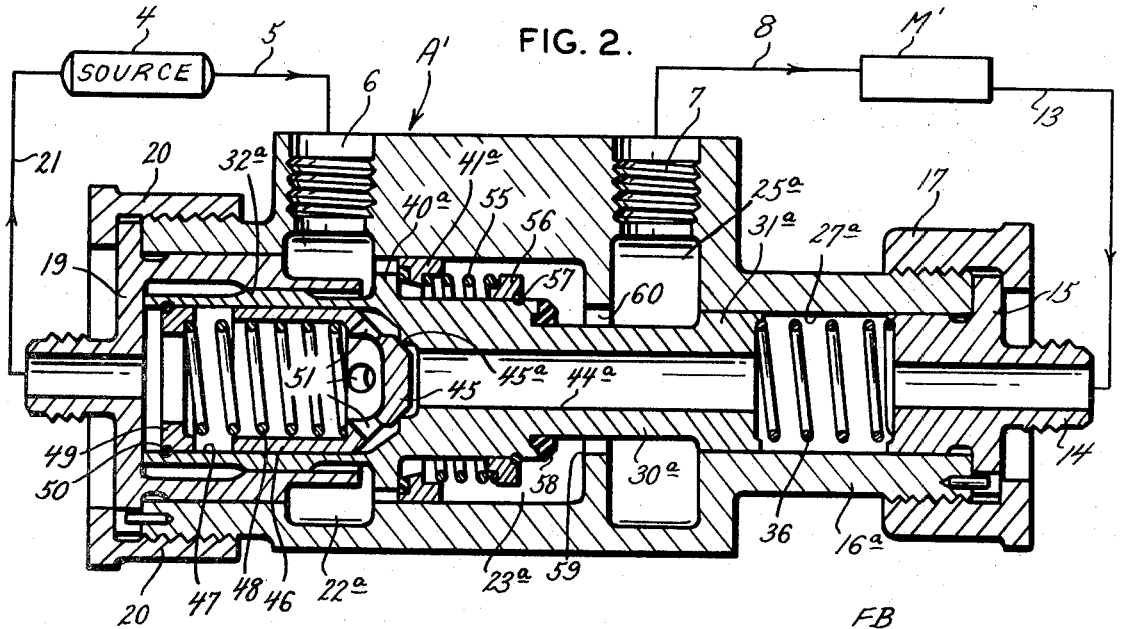

ABSTRACT OF THE DISCLOSURE

A flow comparing shut-off valve connected into both a fluid supply line and a fluid return line of a pressure fluid system such that a change in the flow of fluid from a predetermined normal in either the supply or return line will cause the valve to move to shut-off the flow in the system to prevent complete loss of fluid.

---

This invention pertains to flow comparing shut-off valves for preventing loss of fluid in a pressure fluid system, and it is particularly directed to the structural and operational features of such a valve.

The problem in conventional pressure fluid systems is such that there is no correlation between the flow in the pressure side of the system and the flow in the return side of the system. It appears that the principle of conventional pressure fluid systems is to keep the supply and return sides independent of each other and if safety devices are incorporated, such safety devices are generally in the nature of one way check valves mounted in the return conduits and excess flow or quantity measuring devices mounted in the supply conduits.

The present invention is directed to a shut-off valve for a pressure fluid system such that, during normal operation of the system, flow of fluid in the supply line results in a corresponding flow in the return line. Should a leak develop in either the supply or return line there will be an abnormal flow relation between the supply and return lines. The abnormal flow relation is sensed by the present shut-off valve which closes the system in which it is incorporated so that the loss of fluid can be cut to a minimum.

It is, therefore, an important object of the present invention to provide a shut-off valve which is operable to compare the normal and abnormal flow of fluid between supply and return lines of a fluid flow system and to shut off under abnormal flow conditions.

It is also an important object of the present invention to provide a shut-off valve of the foregoing character which is self-resetting once the leakage flow in the system has been repaired.

It is a further object of the present invention to provide a flow comparing shut-off valve which will be insensitive to momentary surges or the presence of air in the system so as to prevent inadvertent closing.

Still another object of the present invention is to provide a flow comparing shut-off valve that is constructed to operate in a manner preventing reverse flow of the fluid through the return line of a fluid flow system.

Other objects and advantages of the present invention will be set forth in more particularity as the following description proceeds in connection with certain preferred embodiments which are illustrated in the accompanying drawings, wherein:

FIG. 1 is a longitudinal sectional view through one presently preferred form of flow comparing shut-off valve which embodies the principles of the present invention;

FIG. 2 is a view similar to FIG. 1 but illustrating another embodiment of a flow comparing shut-off valve which illustrates the principle of the present invention; and FIG. 3 is a fragmentary one half sectional view of a further modification of the present invention.

Before proceeding with a detailed description of the several embodiments of the present invention which are shown in the drawing, it should be understood that the flow comparing shut-off valve has many industrial applications where it is important to protect a fluid flow system against loss at any particular point, which loss if allowed to go unchecked would cripple the entire system. For example, the invention may be used in a fluid flow system where there is a principal source of fluid under pressure of sufficient capacity to operate several remotely located motor means, some of which may be of the reciprocating type and others may be of the rotary type. In such a system it is conceivable that leakage or loss of fluid at one of the remote motor means could bleed the single source of fluid to a point where all of the motor means would be out of operation. The shut-off valve of the invention is intended to be incorporated between the single source of motive fluid and each of the remotely located users or motor means so that each of the motor means will be protected independently of the others, and only if the principal source of motive fluid is put out of operation will all of the remotely located motor means be likewise put out of operation.

In order to accomplish the foregoing objective of the present invention the present shut-off valve is constituted so that it can be connected into the supply and return sides of a fluid flow system so as to continuously compare the flow conditions in both sides and distinguish between normal operating conditions and abnormal operating conditions. One very accurate and simple way to compare flow conditions in the two sides of a fluid flow system is to utilize metering orifices in combination with flow displaceable means so that when the orifices react to an abnormal flow situation the moveable means is able to respond immediately to protect the system. Another way is to incorporate variable volume orifices in connection with displaceable means which is subject to abnormal conditions of fluid flow in a system having supply and return sides.

Turning now to FIG. 1 of the drawing there is shown a presently preferred flow comparing shut-off valve A which is disposed in a fluid flow system having a source 4 of fluid under pressure, which source is connected by a suitable conduit 5 to the inlet port 6 of the valve A. The outlet port 7 of valve A is connected by a suitable conduit 8 to a servo valve unit 9 subject to control settings through an arm 10. This servo unit 9 is connected by reverse flow conduits 11 and 12 to the motor means M, and the unit 9 is also connected by an outgoing flow line 13 to a return port or inlet nipple 14 of the end fitting 15 of the shut-off valve A. It will be observed that the motor means M is in the form of a reciprocating piston in which the usual piston rod R delivers the energy from the fluid supplied to it through the conduits 11 and 12 under the control and direction selected by the servo unit 9. Such a motor means M necessarily involves a different volumetric displacement or flow in conduits 11 and 12 due to the presence of the piston rod R decreasing the capacity of the cylinder on the rod side of the piston. Thus, in the operation of the servo unit 9 at certain times the fluid flow will be from conduit 8 into conduit 11 and the return flow will be through conduit 12 into conduit 13. In this situation the flow in conduits 12 and 13 will have a smaller volume displacement than in the situation where the unit 9 switches the fluid flow from conduit 8 into conduit 12 and cross connects return flow from conduit 11 into conduit 13. In certain modifications the device or instrument actuated by the motor means M is provided with a feed back circuit represented by the broken line F–B which is connected into the servo control arm 10. In this way the work done by the motor means M is constantly being monitored by the servo unit 9 through the feed back circuit to control arm 10.

Turning now to the construction of the shut-off valve A of FIG. 1, it has been pointed out that the body of the valve A is provided with inlet and outlet ports 6 and 7 for connection to the conduit 5 and 8 respectively. It has also been pointed out that the return conduit 13 is connected to the nipple 14 of a suitable end fitting 15 which is fixed in the body extension 16 of the valve A by a suitable screw cap 17. The opposite end of the valve body is provided with a discharge port or nipple 18 of an end fitting 19 suitably clamped to the valve body by a cap 20. The nipple 18 is connected to a suitable conduit 21 which conducts the fluid flow to the source 4 where it re-enters the system as desired.

The body of the valve A is provided with a first chamber 22 communicating with the inlet port 6 and also communicating with an intermediate chamber 23. The chamber 23 is provided with a wall through which opens a passage 24 to communicate with an outlet chamber 25 connected to the outlet port 7. The wall opening 24 is provided with a valve seat 26 for a purpose presently to appear.

Furthermore, the body of the valve A is formed with an internal bore 27 in the neck extension 16 which receives a part of the end fitting 15 to locate the fitting in a concentric position. There is another internal bore 28 located in the opposite end of the body of the valve A to receive the inwardly projecting portion of the end fitting 19 in which is provided an internal bore 29 that may be concentric and of approximately the same diameter as the bore 27 in the body neck 16. The bores 27 and 29 operatively and slideably support a movable member or shuttle 30 by means of the sliding engagement of the enlarged head 31 on the shuttle in the bore 27, and the enlarged portion 32 of the shuttle being slideably mounted in the bore 29 of the end fitting 19. The shuttle means 30 is suitably maintained in a leftwardly displaced position with its end skirt 33 abutting the fitting 19, while the opposite enlarged end 31 is formed with an extension 34 which slideably engages in a dashpot 35. The position of the shuttle 30 is maintained by the compression spring 36 so that the shuttle may move rightwardly by compressing the spring 36, in which event the extension 34 moves farther into the dashpot 35 expelling fluid in the dashpot chamber through the orifice 37. The dashpot 35 is an integral part of the fitting 15 and the flow of return fluid occurs through the fitting bore 15a and through the branch passages 15b into the chamber defined by the bore 27.

It is observed that the shuttle 30 is provided with an enlarged portion 40 intermediate its ends and in which a plurality of fixed orifices 41 are formed. Two such orifices 41 are shown in FIG. 1, but it is understood that the number of such orifices can vary according to requirements. The orifices 41 jointly permit fluid to flow from the chamber 22 into the chamber 23, but in the normal operation the volume of the flow is of such quantity that a force is built up on the inlet side of the portion 40 of the shuttle 30 so that the shuttle 30 is displaced in a rightward direction against the compression of the spring 36. Once flow has been established through the orifices 41, such flow passes through the system and creates a return flow through the conduit 13 and bore 15a of the fitting 15 where such flow enters through passages 15b into the chamber defined by bore 27. The return flow thus established passes through a plurality of fixed orifices 42 formed in the enlarged portion 31 of the shuttle 30. The orifices 42 are of a size and sufficient in number to establish a normal balance of flow opposed to the flow through the first mentioned orifices 41 so that the shuttle 30 maintains an operating position in which the enlarged portion 40 is located somewhere in the intermediate chamber 23 so that the seal element or valve 43 thereon does not close on the seat 26 surrounding the passage 24. The return fluid flow through orifices 42 passes through the bore 44 of the shuttle 30 against the head 45 of a check valve 46 slideably mounted in the bore 47 of the shuttle enlarged portion 32. The return flow overcomes the check valve spring 48 which is fitted against an abutment ring 49 fixed in position by a locking ring 50, and in so doing flows through a plurality of ports 51 in the head of the check valve 46 and then through the discharge nipple 18 on its way to conduit 21.

It will be seen in FIG. 1 that the extension 34 on the shuttle 30 is formed with a plurality of ports 52 which are so located with respect to the end edge 35a of the dashpot body 35 that as the shuttle 30 moves in a rightward direction due to the flow into chamber 22 the ports 52 are progressively cut off from communication with the adjacent chamber defined by the bore 27. The return flow from conduit 13 toward conduit 21, through the body of the valve A and through the passage 34 in the shuttle 30, is confined more and more, as the ports 52 are closed, to a volume that will pass through the orifice 42. Thus, there is a certain dynamic force developed against the enlarged portion 31 of the shuttle 30 opposing the dynamic force build-up to the left of the shuttle enlarged portion 40 in which the orifices 41 are located so that the shuttle 30 assumes an equilibrium position for normal operation in which the valve 43 does not close on the seat 26 and interrupt the flow of pressure fluid from conduit 5 into conduit 8.

The operation of the system and flow comparing shut-off valve of FIG. 1 should now be more easily understood. Normal operation of the valve A where all portions of the system are functioning correctly will find the shuttle 30 displaced rightwardly from the position shown, but not to a point where the valve 43 closes on the seat 26. The motor means M is of a type where in one direction of its operation it displaces a greater volume of fluid than in the reverse direction. Thus, the return side of the valve A is subject every half cycle of the setting of the servo unit 9 to a change in the volume of flow in the orifices 42. In normal operation when the motor means is operating on a cycle where the lesser volume displacement is directed by the unit 9 from conduit 12 into the return conduit 13 the shuttle 30 will normally assume a position in which the ports 42 are covered by the edge 35a of the dashpot 35. On the other hand, when the motor means M is in the other cycle of its operation, where the greater volume of fluid is displaced from conduit 11 into conduit 13, there will be a build-up of pressure in the chamber defined by bore 27 against the enlarged end 31 of the shuttle 30, and the result is that the shuttle 30 is displaced in a leftward direction, aided by the spring 36, and uncovers one or more of the ports 52 until the returning volume of fluid flow may pass into the shuttle bore 44 without developing an undesirable high pressure condition and a resulting energy loss.

An abnormal condition of operation of the shut-off valve A of FIG. 1 occurs when there is a leak, for example, in conduit 8. In this situation the return flow through fitting 15 is materially reduced and this unbalances the equilibrium or force and flows between the orifices 41 and 42 so that the flow through orifices 41 predominates and displaces the shuttle 30 rightwardly until the valve 43 engages on its seat 26 so that the fluid flow is shut off. There is also the condition of abnormal operation where the servo unit 9 shuts off cross flow from the conduits 11 and 12, and where a leak develops in conduits 13. When this latter condition occurs there is a flow from the source of fluid 4 through conduit 21 and reversely through the valve A to the nipple 14 and thence to the point of the leak. This abnormal condition is immediately sensed and checked by the presence of the check valve 46 in which the head 45 closes the passage 44 and the unbalance in pressure will cause shuttle 30 to move rightwardly until the valve 43 engages on its seat 26 so that the pressure fluid is also shut off.

It is, of course, understood that the orifices 41 and 42 may be variously sized and numbered to accommodate any desired predetermined volume flow condition. In the example shown in the drawing the orifices 41 and 42 are proportioned so that when the ratio of the flow between ports 6 and 7 through the orifice 41 is greater than three times the reverse flow of the fluid through the orifice 42 from the conduit 13 toward the conduit 21, the valve will close by having the valve 43 engage on the seat 26. This means that the motor means M may have a differential volume displacement, depending on the direction of the movement of the rod R, of the ratio of three volumes in conduit 11 to one volume in conduit 12 and when the three volumes move from conduit 11 into conduit 13 the excess flow which cannot be accommodated through the orifice 42 merely displaces the shuttle 30 in a leftwardly direction and the excess is easily expelled through the ports 52 into the passage 44. In the reverse cycle of movement of the motor means M the flow of one volume of fluid through the conduit 12 and into the return conduit 13 will find the shuttle 30 in its normal position of equilibrium where the ports 52 are cut off by the edge 35a of the dashpot 35. Thus, in the back and forth movement of the motor means M the shuttle 30 will respond in a back and forth cycle of movement, but that will not make the valve A insensitive to the development of an abnormal condition, such as a leak somewhere in the system between the conduit 8 and the return conduit 13, and render it ineffective to perform the function desired.

Turning now to FIG. 2, there is shown a somewhat modified form of flow comparing shut-off valve. In the following description similar and like parts shown in the valve assembly of FIG. 2 will be given reference numerals of parts which are similar to those heretofore pointed out and described in connection with the shut-off valve A of FIG. 1. Accordingly, it is observed that the valve A' of FIG. 2 is arranged with ports 6 and 7 and return flow fittings 15 and 19 as in the first described valve assembly. Also, the valve body slideably receives a slightly modified shuttle 30a, and the modification is evident in that there are no fixed orifices for sensing the flow conditions. In place of the fixed orifices the modification shuttle 30a is provided with an enlarged flange 40a intermediate its ends, which flange is disposed to move longitudinally in the intermediate chamber 23a. The flange 40a forms a seat for a valve ring 41a to form a variable area orifice between the two when the valve 41a is forced off of its seat by the flow of fluid from chamber 22a to chamber 23a. The valve ring 41a is urged against its seat on the flange 40a by a compression spring 55 working against the abutment ring 56 which is keyed to the body of the shuttle 30a by a key ring 57.

The assembly of valve A' differs from the first described valve A in that the enlarged end 31a of the shuttle 30a is now open to the chamber in the extension neck 16a of the valve body, such chamber being defined by the bore 27a. The shuttle 30a is provide with an axially elongated passage 44a which directs the fluid flow against the head 45 of the check valve 46 slideably mounted in the bore 47 of the enlarged end portion 32a of the shuttle. The flow will normally force the check valve 46 to an open position so that the fluid may pass through the various ports 51 and through the discharge nipple 18 to conduit 21.

It is pointed out that the valves of FIGS. 1 and 2 may be used with the motor means M or M', and the valve of FIG. 2 may be equipped with the extension 34 and dashpot 35, depending on the dynamics of the particular system being considered.

The operation of the valve A' of FIG. 2 may now be better understood in the following description of its operation. Let it be assumed that the fluid system is shut down and in which event the spring 36 will position the shuttle 30a with its end skirt 33 abutting the end wall of the fitting 19. The check valve 46 will be in its closed position due to the action of the spring 48, and the ring valve 41a will also be closed against its seat on the flange 40a. Upon activation of the source of pressure fluid the flow through conduit 5 and into port 6 and chamber 22a will build up against the ring valve 41a and cause it to open against the resistance of its spring 55. The ring valve 41a will leave its seat to a sufficient extent to open an annular orifice or passage into the intermediate chamber 23a. The fluid flow thru the annular orifice and resulting pressure differential will initiate rightward sliding movement of the shuttle 30a against the return spring 36. Once flow through chamber 25a is established the fluid returning through nipple 14 and into the passage 44a of the shuttle 30a will create a force on the shuttle 30a tending to displace it leftwardly. Concurrently the flow in passage 44a will activate the check valve 46 to establish an annular orifice opening at the seat 45a. As a consequence of the foregoing movement of the various parts within the valve A', an equilibrium position will be established for the shuttle 30a between the force of the fluid flowing from inlet port 6 to outlet port 7 and the reverse flow from return nipple 14 to discharge nipple 18. The equilibrium may undergo a certain range of fluctuation or varying in which the orifices formed at the valve ring 41a and the orifices formed in the head 45 of the check valve 46 will adjust in area to accommodate the dynamics of the fluid flow. It can thus be appreciated that the valve A' is quite similar to the valve A of FIG. 1, the essential difference being the incorporation of variable orifice means in the valve A.

Should a leak occur in conduit 8 the immediate drop in return fluid flow through the valve A' will cause the fluid flow at inlet port 6 to move the shuttle 30a far enough in a rightward direction to cause the seal element or valve 58 on the body of the shuttle 30a to close on the seat 59 which is formed around the passage 60 between the chamber 23a and the outlet chamber 25a. This action will, of course, prevent further loss of fluid from the system. It is also noticed that the loss of fluid by reverse flow through the conduit 21 to conduit 13 will be immediately prevented by reason of the presence of the check valve 46 in the system. This is, of course, the same function performed by the check valve 46 in FIG. 1.

Turning now to FIG. 3, it can be seen that the modified valve B is provided with a boss 61 for the connection of the return fluid conduit 13 of a fluid flow system such as is shown in either FIGS. 1 or 2. The interior of the valve body 62 is provided with a liner member 63 having a number of ports 64 which open to a chamber 65. Slideably mounted within the chamber 65 is a shuttle member 66 formed with an axial extension 67. The extension 67 has a fluid flow opening represented by one or more fixed orifices 68 therein communication with the interior passage 69 of the shuttle 66, and the extension 67 is also formed with a port 70 that is more or less open to the chamber 65 at the cut off edge 71 of a dashpot member 72. The dashpot member 72 is movably mounted in the closed end of the valve body 62 and a passage 73 opens from the interior of the dashpot along the closed wall of the valve body 62 to the chamber 65. This passage 73 permits the shuttle extension 67 to slide back and forth in the dashpot 72, whereby the port 70 may be more or less cut off by the dashpot edge 71. A compression spring 74 is mounted between the dashpot flange 75 and the enlarged portion of the shuttle 66 so that the shuttle 66 is constantly urged leftwardly while the dashpot 72 is held against the closed end of the valve body 62. The flow of fluid through the orifice 68, and at times through the port 70, passes into the passage 69 of the shuttle where it encounters a check valve 76. The structure shown in FIG. 3 is similar to the structure shown in FIG. 1, the exception being that the assembly of FIG. 3 is more economically effected. However, the operation of the modified valve B of FIG. 3 is like that of the operation of valve A of FIG. 1.

What is claimed is:

1. In a pressure fluid system having a fluid supply side and a fluid return side, a control valve operably connected between said supply and return sides to sense normal and abnormal flow in the system and to shut off abnormal flow to prevent loss of fluid, said control valve including a body having spaced inlet and outlet ports connected into the fluid supply side and spaced return and discharge ports connected into the fluid return side, a valve seat between said inlet and outlet ports, a fluid flow responsive member movably mounted in said body and having a valve thereon to cooperate with said valve seat to shut off fluid flow in the supply side, biasing means in the body for urging the flow responsive member to a position in which the valve on said member and the valve seat are separated so that at the outset of operation fluid can flow between the inlet and the outlet ports, said movable member having a flow passage therethrough in communication between said return and discharge ports, and a valve element in said flow passage to shut off fluid flow in the return side, said ports being disposed in the valve body and said movable member being configured such that the pressure of the fluid introduced through the inlet port and the pressure of the fluid introduced through the return port create opposing forces on the member, whereby under abnormal flow conditions the pressure at the return port will drop significantly and the pressure at the inlet port will shift the fluid flow responsive member such that the valve thereon engages the valve seat and blocks the flow between the inlet and outlet ports.

2. A shut-off valve comprising a chambered body having an inlet port for receiving a fluid flowing under pressure and an outlet port for the fluid flow, flow control means movable in said chambered body from a first position in which the fluid under pressure flows from said inlet to said outlet ports to a second position in which the fluid flow is shut off, a spring in said body for biasing the control means to the first position so that normally and at the outset of operation fluid can flow between the inlet and outlet ports, said body having a fluid flow receiving passage and a fluid flow discharge passage, said control means having an internal passageway connecting said receiving and discharge passages and isolating the fluid flow therein from the fluid flow between said inlet and outlet ports, a check valve operably disposed in said passageway to shut off fluid flow in a direction from said discharge passage to said receiving passage, and means connected between said outlet port and said fluid flow receiving passage to direct the fluid flow therebetween, the flow into said receiving passage being in a direction reverse to the flow between said inlet and outlet ports and acting on said control means normally to sustain it in said first position, said control means moving into said second position upon flow between said inlet and outlet port dynamically moving said control means in opposition to the dynamic effect of the fluid flow in said passageway.

3. A shut-off valve for a hydraulic system including a source of pressurized fluid and motor means operable by the pressurized fluid; said shut-off valve comprising a valve body having a chamber; a shuttle within the chamber and shiftable to and fro therein; a valve seat on the valve body and exposed to the chamber; a seal element carried by the shuttle and engageable with the valve seat for blocking the chamber so that fluid can not flow through it along the shuttle; a high pressure inlet port in the valve body and connected with the source of pressurized fluid; a high pressure outlet port in the valve body and connected with the motor means; the inlet and outlet ports communicating with the chamber on the opposite sides of the valve seat so that fluid will flow through the chamber between the two ports when the seal element and seat are separated but will not flow when the seal element and seat are in sealing engagement; a spring in the valve body for normally biasing the shuttle to the position in which the seal element and the seat are separated so that fluid at the outset of operation normally flows through the chamber from the inlet to the outlet ports; the shuttle engaging and forming a seal with the walls of the chamber beyond the high pressure inlet and outlet ports and being configured such that the high pressure fluid introduced through the inlet port creates a force thereon which urges the seal elements toward one another; a return port in the valve body and connected with the motor means for receiving fluid therefrom, the return port communicating with the end of the chamber located beyond the seal-forming engagement of the shuttle and chamber walls such that the pressure of the fluid introduced through the return port exerts a force on the shuttle in opposition to the force exerted on it by the high pressure fluid, thereby supplementing the force exerted by the spring; and a discharge port in the valve body and connected with the source of fluid for returning fluid thereto, the discharge port further being adapted to receive fluid from that portion of the chamber into which the return port opens.

4. A shut-off valve according to claim 3 having its high pressure outlet port and return port connected to a control unit, the control unit in turn being connected with the motor means for controlling its operation.

5. A shut-off valve according to claim 3 wherein the shuttle is provided with a longitudinally extending passage communicating at its one end with that portion of the chamber into which the return port opens and communicating at its other end with the discharge port, the longitudinally extending passage being isolated from the high pressure inlet and outlet ports.

6. A shut-off valve according to claim 5 and further characterized by a check valve carried by the shuttle and interposed in the passage extending therethrough, the check valve being oriented such that it permits fluid to flow through the passage from the return port to the discharge port after the fluid at the return port reaches a predetermined pressure, but precludes fluid from flowing in the reverse direction through the passage.

7. A shut-off valve according to claim 5 and further characterized by flow control means for varying the flow of fluid through the return port in response to the position of the shuttle in the chamber, the flow control means increasing the flow of fluid through the return port as the shuttle moves the seal element away from the valve seat.

8. A shut-off valve according to claim 5 and further characterized by a dashpot between the shuttle and valve body.

9. A shut-off valve according to claim 8 wherein the dashpot comprises a cup carried by the valve body and projecting into the chamber, an extension on the shuttle having a closed end thereon projecting into the cup, and at least one orifice in the side wall of the extension and normally providing communication between the chamber and passage, the orifice being located such that the end of the cup passes across it as the shuttle moves toward the cup whereby the effective size of the orifice is reduced and less fluid flows from the return port into the passage.

10. A shut-off valve according to claim 3 wherein the shuttle is provided with an enlarged portion which wipes the walls of the chamber intermediate the high pressure inlet and outlet ports, and wherein the enlarged portion is provided with orifices for permitting fluid to flow along the shuttle past the enlarged portion.

11. A shut-off valve according to claim 3 wherein the spring is disposed in that portion of the chamber into which the return port opens.

References Cited

UNITED STATES PATENTS

| | | | |
|---|---|---|---|
| 931,532 | 8/1909 | Wainwright | 137—514.7 |
| 1,631,142 | 6/1927 | Masters | 137—514.7 |
| 2,557,333 | 6/1951 | Zwack | 137—538 XR |
| 3,234,959 | 2/1966 | Feinberg | 137—538 XR |
| 2,217,635 | 10/1940 | Bailey | 137—100 XR |
| 2,428,150 | 9/1947 | Field | 137—100 XR |
| 2,574,416 | 11/1951 | Rose | 91—446 |

HAROLD W. WEAKLEY, Primary Examiner

U.S. Cl. X.R.

137—514.5